United States Patent
Chien (10) Patent No.: US 11,116,047 B2
(45) Date of Patent: Sep. 7, 2021

(54) HEATING DEVICE AND CAMERA USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventor: Liang-Cheng Chien, Kaohsiung (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 397 days.

(21) Appl. No.: 16/235,791

(22) Filed: Dec. 28, 2018

(65) Prior Publication Data

US 2019/0208577 A1   Jul. 4, 2019

(30) Foreign Application Priority Data

Dec. 29, 2017   (CN) .......................... 201711480866.7

(51) Int. Cl.
| | | |
|---|---|---|
| *H05B 3/84* | (2006.01) | |
| *G03B 17/55* | (2021.01) | |
| *H05B 3/14* | (2006.01) | |
| *G03B 17/08* | (2021.01) | |

(52) U.S. Cl.
CPC .............. *H05B 3/84* (2013.01); *G03B 17/55* (2013.01); *H05B 3/14* (2013.01); *G03B 17/08* (2013.01)

(58) Field of Classification Search
CPC .................................. F16L 53/35; G03B 17/55
See application file for complete search history.

(56) References Cited

U.S. PATENT DOCUMENTS

| | | | | |
|---|---|---|---|---|
| 2,442,913 A | * | 6/1948 | Abrams ................. | G03B 17/55 359/820 |
| 8,977,155 B2 | * | 3/2015 | Shimura ............ | G03G 15/2039 399/67 |
| 9,418,635 B1 | * | 8/2016 | Bedlington .............. | G10D 9/03 |
| 10,366,113 B2 | * | 7/2019 | Simms .................... | G06F 16/29 |

(Continued)

FOREIGN PATENT DOCUMENTS

| | | | |
|---|---|---|---|
| CN | 106534631 A | * | 3/2017 |
| CN | 106534631 A | | 3/2017 |
| CN | 106560742 A | | 4/2017 |

OTHER PUBLICATIONS

Office Action corresponding to Chinese Application No. 201711480866.7 and issued by China National Intellectual Property Administration dated Sep. 21, 2020, 8 pages.

*Primary Examiner* — Clayton E. LaBalle
*Assistant Examiner* — Leon W Rhodes, Jr.
(74) *Attorney, Agent, or Firm* — Innovation Counsel LLP (57) ABSTRACT

A heating device is provided. The heating device is installed on a camera device, and includes a thermal sleeve, a thermally conductive elastomer and a heating sheet. The thermal sleeve has an inner-wall surface and an outer-wall surface. The thermally conductive elastomer is configured on the inner-wall surface of the thermal sleeve. The heating sheet is configured on the outer-wall surface of the thermal sleeve. The heat generated by the heating sheet can be transferred to the lens of the camera through the thermal sleeve and the thermally conductive elastomer to defog and defrost the lens.

20 Claims, 6 Drawing Sheets

(56) References Cited

U.S. PATENT DOCUMENTS

| | | | |
|---|---|---|---|
| 10,761,316 B2* | 9/2020 | Miyaharu | G02B 26/0833 |
| 2012/0006517 A1* | 1/2012 | Baird | F16L 53/38 |
| | | | 165/135 |
| 2017/0099700 A1 | 4/2017 | Chae et al. | |
| 2019/0278158 A1* | 9/2019 | Ishizuka | G03B 17/55 |

* cited by examiner

HEATING DEVICE AND CAMERA USING THE SAME

This application claims the benefit of People's Republic of China application Serial No. 201711480866.7, filed on Dec. 29, 2017, the subject matter of which is incorporated herein by reference.

BACKGROUND OF THE INVENTION

Field of the Invention

The invention relates in general to a heating device and camera using the same, and more particularly to a heating device with thermally conductive elastomer and a camera using the same.

Description of the Related Art

When the vehicle camera is exposed in a low-temperature environment, water moisture may condense as fog, frost or ice on the lens surface and affect the image capturing quality of the camera. Therefore, it has become a prominent task for the industries to provide a camera capable of operating normally in a low-temperature environment.

SUMMARY OF THE INVENTION

The invention is directed to a heating device and a camera using the same capable of resolving the generally-known problems disclosed above.

According to one embodiment of the present invention, a heating device is provided. The heating device is installed on a camera device. The heating device includes a thermal sleeve, a thermally conductive elastomer and a heating sheet. The thermal sleeve has a first inner-wall surface and a first outer-wall surface. The thermally conductive elastomer is configured on a first inner-wall surface of the thermal sleeve. The heating sheet is configured on a first outer-wall surface of the thermal sleeve.

According to another embodiment of the present invention, a camera is provided. The camera includes a camera device and a heating device. The heating device is installed on a camera device. The heating device is installed on the camera device. The heating device includes a thermal sleeve, a thermally conductive elastomer and a heating sheet. The thermal sleeve has a first inner-wall surface and a first outer-wall surface. The thermally conductive elastomer is configured on a first inner-wall surface of the thermal sleeve. The heating sheet is configured on a first outer-wall surface of the thermal sleeve.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
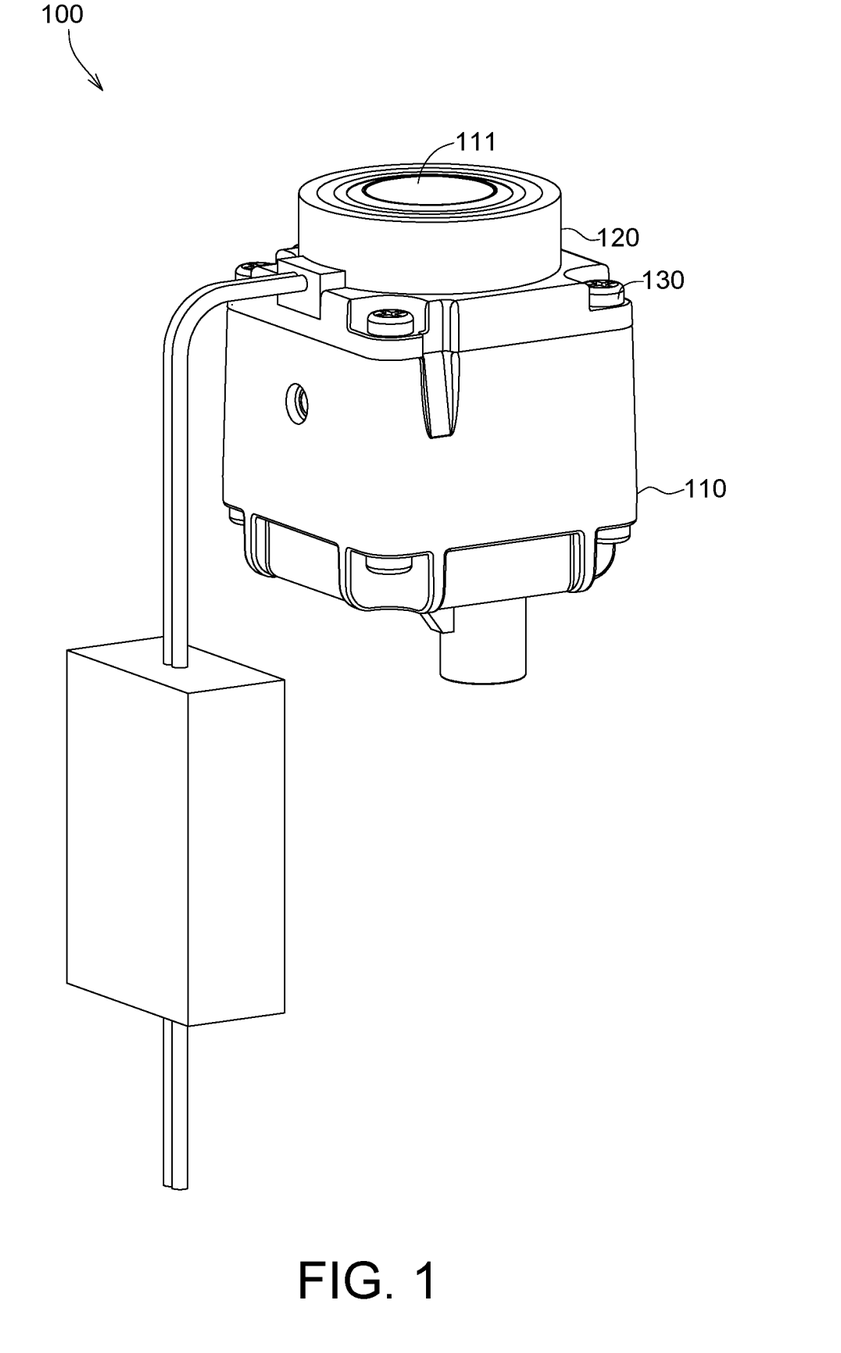
FIG. 1 is a schematic diagram of a camera according to an embodiment of the present invention.
Figure 2:
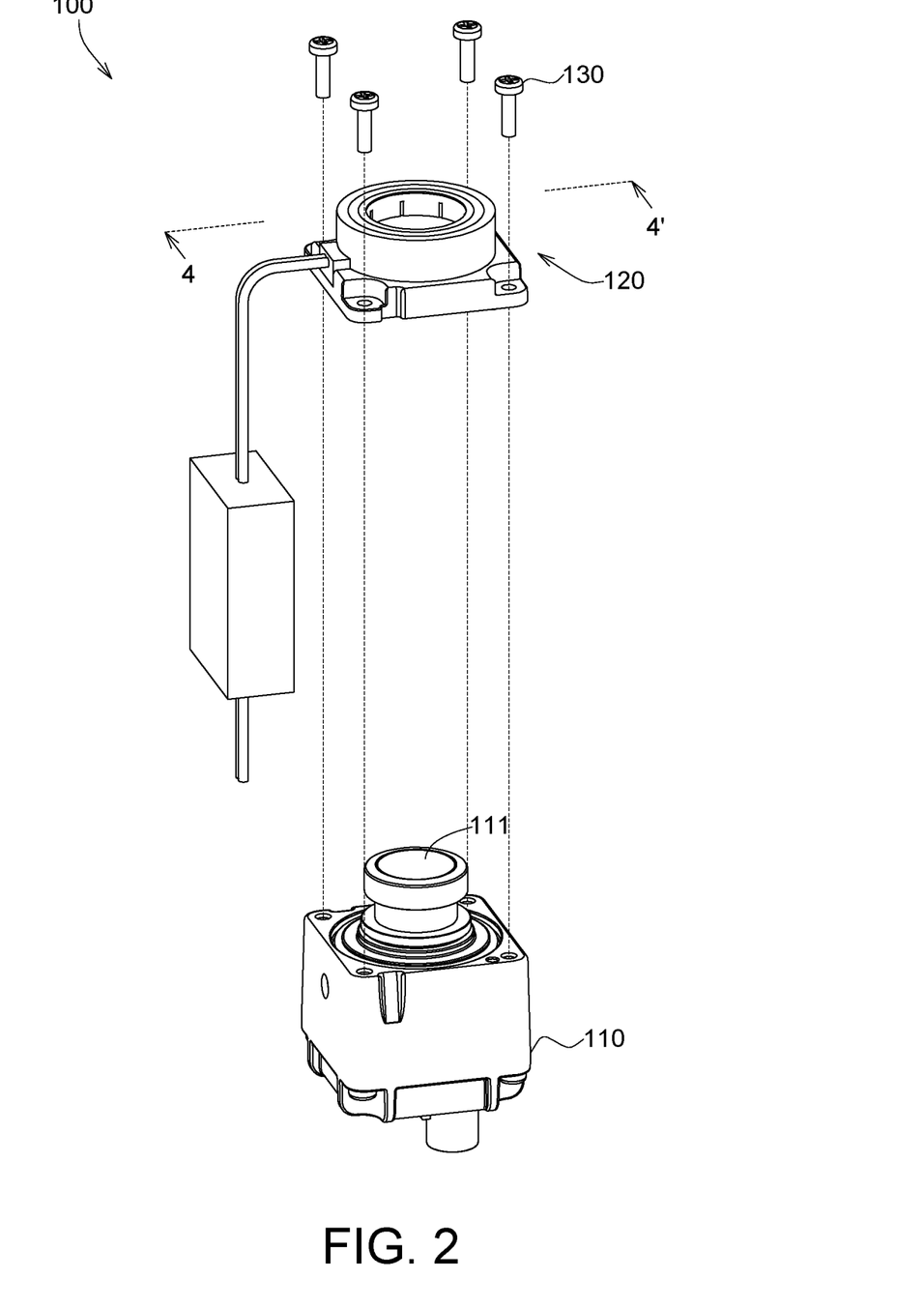
FIG. 2 is an explosion diagram of the camera of FIG. 1.

Refer to FIGS. 1 and 2. FIG. 1 is a schematic diagram of a camera 100 according to an embodiment of the present invention. FIG. 2 is an explosion diagram of the camera 100 of FIG. 1. The camera 100 can be used in a transportation carrier such as a vehicle. The camera 100 includes a camera device 110, a heating device 120 and at least one fixing element 130, wherein the heating device 120 is installed on the camera device 110 and is configured to heat the lens 111 of the camera device 110 to defog or defrost the lens 111. Thus, the camera 100 can be used in a low-temperature environment.

As indicated in FIG. 2, the heating device 120, such as a plug-in device, can be detachably disposed on the camera device 110 through a fixing element 130. The fixing element 130 can be screw, for example. In another embodiment, the heating device 120 and the camera device 110 can be engaged with each other or coupled using a welding technology. In another embodiment, the heating device 120 can be a built-in (non-plug-in) device.

Figure 3:
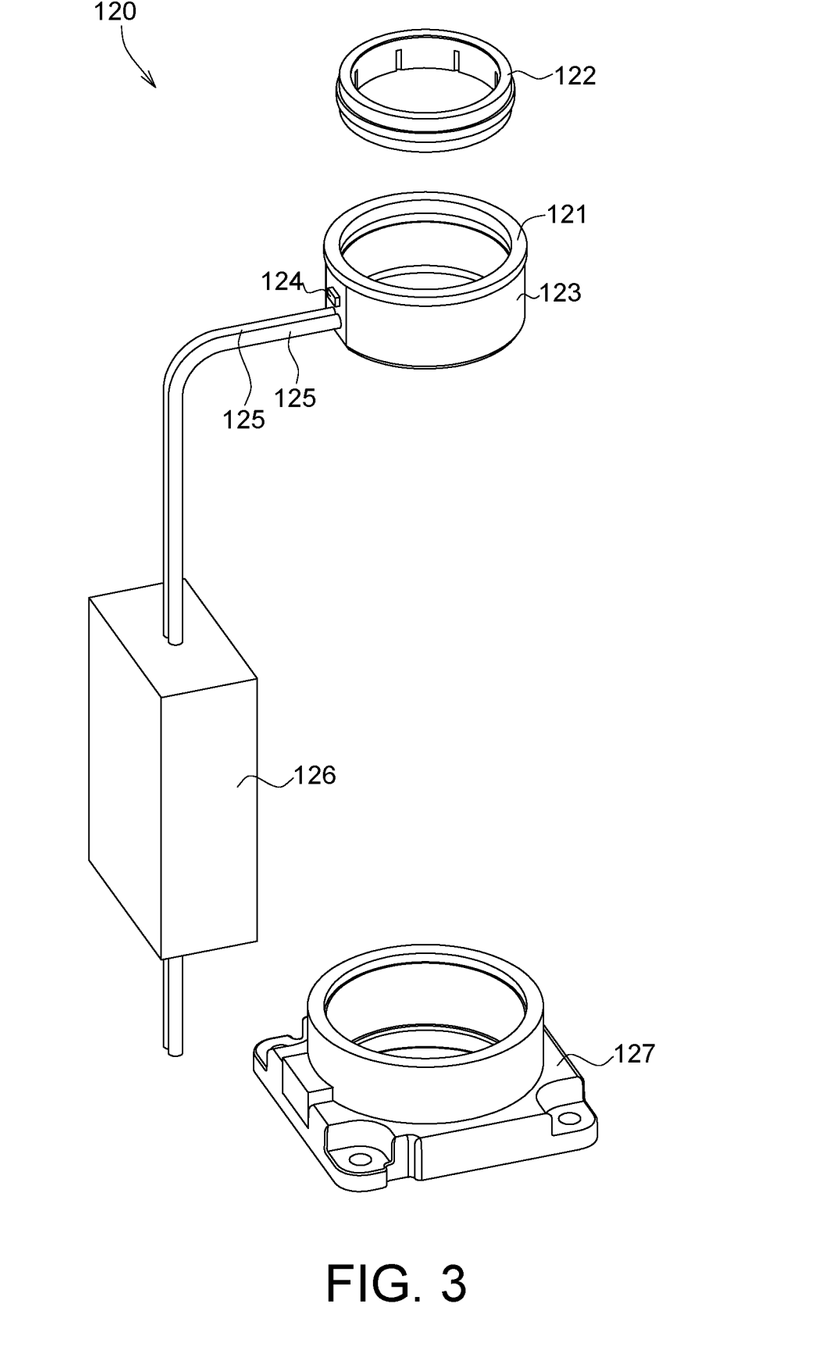
FIG. 3 is an explosion diagram of the heating device of FIG. 2.
Figure 4:
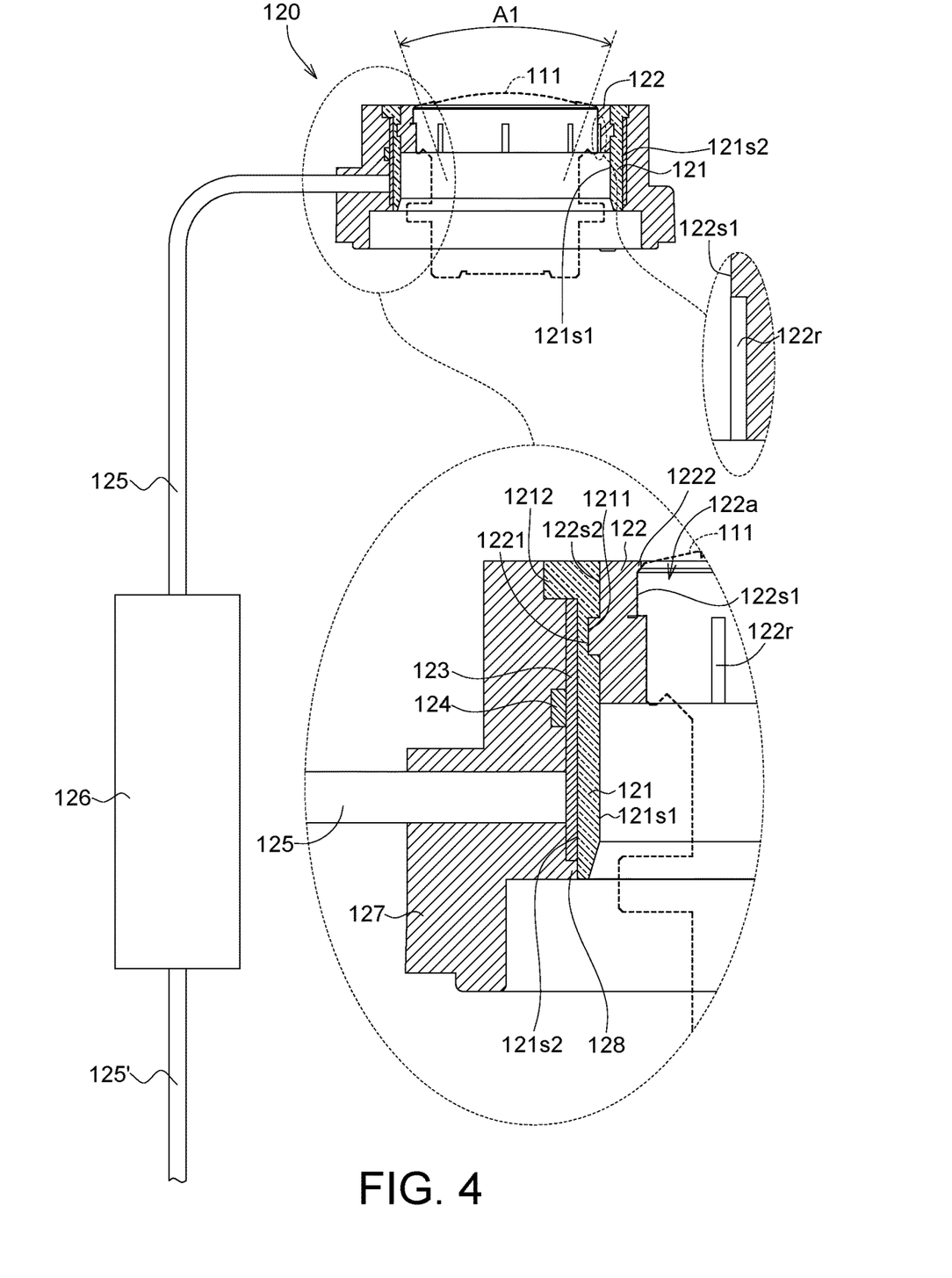
FIG. 4 is a cross-sectional view taken along line 4-4' of FIG. 2.

Refer to FIGS. 3 and 4. FIG. 3 is an explosion diagram of the heating device 120 of FIG. 2. FIG. 4 is a cross-sectional view of the heating device 120 taken along line 4-4 of FIG. 2'. The heating device 120 includes a thermal sleeve 121, a thermally conductive elastomer 122, a heating sheet 123, a temperature sensor 124, at least one conducting wire 125, a controller 126, and a casing 127.

As indicated in FIG. 4, the thermal sleeve 121 has a first inner-wall surface $121s1$ and a first outer-wall surface $121s2$. The thermally conductive elastomer 122 is configured on the first inner-wall surface $121s1$ of the thermal sleeve 121. The heating sheet 123 is configured on the first outer-wall surface $121s2$ of the thermal sleeve 121. Thus, the heat H1 generated by the heating sheet 123 can be transferred to the lens 111 through the thermal sleeve 121 and the thermally conductive elastomer 122 to defog or defrost the lens 111. In an embodiment, the thermal sleeve 121 can be formed of copper, aluminum or other material with superior thermal conductivity, for example. The heating sheet 123 can be realized by a polyimide (PI) film heater, and the thermally conductive elastomer 122 can be formed of cured liquid silicone.

As indicated in FIGS. 3 and 4, the temperature sensor 124 is configured on the heating sheet 123 for sensing the temperature of the heating sheet 123 and outputting a temperature sensing signal (not illustrated). The temperature sensing signal can be transmitted to the conducting wire 125 through the heating sheet 123 (not illustrated). The conducting wire 125 is connected to the heating sheet 123 and is further electrically connected to the temperature sensor 124 through the heating sheet 123. The controller 126 is located outside the heating sheet 123 and is connected to the heating sheet 123 through the conducting wire 125. Thus, the controller 126 can control the temperature of the heating sheet 123 through the conducting wire 125. The controller 126 can control the temperature of the heating sheet 123 according to the temperature sensing signal of the temperature sensor 124. For example, when the temperature of the heating sheet 123 is lower than a pre-determined temperature (such as 60° C.), the controller 126 provides an even larger current to the heating sheet 123 to increase the temperature of the heating sheet 123. When the temperature of the heating sheet 123 is higher than the pre-determined temperature, the controller 126 provides a reduced current to the heating sheet 123 or temporarily stops providing current to the heating sheet 123, such that the temperature of the heating sheet 123 can be reduced.

As indicated in FIG. 4, the conducting wire 125 passing through the casing 127 extends outwards to the controller 126 from the heating sheet 123. Another conducting wire 125' is connected to the controller 126 and can be electrically connected to an external electronic device (not illustrated). The external device, such as a battery of a transportation carrier (such as a vehicle) or a controller, provides a power to the controller 126 through the conducting wire 125' or is electrically connected to the controller 126. In the present embodiment as indicated in FIG. 4, the controller 126 is located outside the casing 127. However, in another embodiment, the controller 126 can be configured inside the camera device 110.

As indicated in FIGS. 3 and 4, the thermally conductive elastomer 122 has an accommodation portion 122a for receiving the lens 111. The thermally conductive elastomer 122 has at least one groove 122r and a second inner-wall surface 122s1, wherein the groove 122r is located on the second inner-wall surface 122s1. That is, the groove 122r is extended outwards from the second inner-wall surface 122s1, but does not penetrate through the thermally conductive elastomer 122. The groove 122r has an allowance for the deformation of the thermally conductive elastomer 122, which occurs when the thermally conductive elastomer 122 is squeezed or is expanded due to thermal expansion. The design of allowance avoids the thermally conductive elastomer 122 being over-distorted or deformed during the manufacturing process, assures tight contact between the thermally conductive elastomer 122 and the lens 111, and increases the convenience of assembly between the lens 111 and the thermally conductive elastomer 122. This is, if the thermally conductive elastomer 122 has a smaller deformation, it is easier for the lens 111 to be assembled thereto.

As indicated in FIGS. 3 and 4, the thermally conductive elastomer 122 can be coupled to the thermal sleeve 121 using an injection molding technology. Therefore, the tight contact between the thermal sleeve 121 and the thermally conductive elastomer 122 can enhance the bonding between the thermal sleeve 121 and the thermally conductive elastomer 122. Due to the tight contact between the thermal sleeve 121 and the thermally conductive elastomer 122, the thermal resistance between the thermal sleeve 121 and the thermally conductive elastomer 122 is low, and the heat transfer effect is excellent. Additionally, due to the softness and elasticity of the thermally conductive elastomer 122, the contact between the thermally conductive elastomer 122 and the lens 111 is tight. Thus, the low thermal resistance between the thermally conductive elastomer 122 and the lens 111 can achieve an excellent heat transfer effect.

As indicated in FIGS. 3 and 4, the thermally conductive elastomer 122 further has a second outer-wall surface 122s2 and at least one first engagement portion 1221, wherein the first engagement portion 1221 is formed on the second outer-wall surface 122s2. The thermal sleeve 121 has a second engagement portion 1211 matching the first engagement portion 1221 of the thermally conductive elastomer 122. The second engagement portion 1211 is formed on the first inner-wall surface 121s1. The first engagement portion 1221 is engaged with the second engagement portion 1211 to more firmly fix the relative position between the thermal sleeve 121 and the thermally conductive elastomer 122. In an embodiment, the first engagement portion 1221 can be a protrusion and the second engagement portion 1211 can be an indentation. In another embodiment, the first engagement portion 1221 can be an indentation, and the second engagement portion 1211 can be a protrusion.

As indicated in FIGS. 3 and 4, the thermally conductive elastomer 122 further has a first flange 1222 located on the leading edge of the thermally conductive elastomer 122 and protruded from the second inner-wall surface 122s1. The first flange 1222 can tightly lean on the lens 111 to avoid external impurities or fluid penetrating the camera 100. The fluid is such as water. In other words, the first flange 1222 of the thermally conductive elastomer 122 can provide a waterproof function. Besides, the first flange 1222 is located outside the image capturing range A1 of the camera device 110 lest the image capturing quality might be affected.

As indicated in FIGS. 3 and 4, the thermal sleeve 121 has a second flange 1212 extended outwards from the first outer-wall surface 121s2. Since the heating sheet 123 is stopped by the second flange 1212, the heating sheet 123 will not be protruded or exposed from the heating device 120, and the volume of heat loss will be reduced. The second flange 1212 can be located either at the top or the bottom of the thermal sleeve 121.

As indicated in FIGS. 3 and 4, the casing 127 covers a lateral side of the thermal sleeve 121, the heating sheet 123 and the temperature sensor 124. The heating sheet 123 is completely sealed by the casing 127 and the thermal sleeve 121, therefore the heat of the heating sheet 123 can be secured within the heating device 120, and the volume of heat loss can be reduced. A third flange 128 is disposed at the bottom of the inner edge of the casing 127 to stop the heating sheet 123 and to avoid the heating sheet 123 being protruded.

Figure 5:
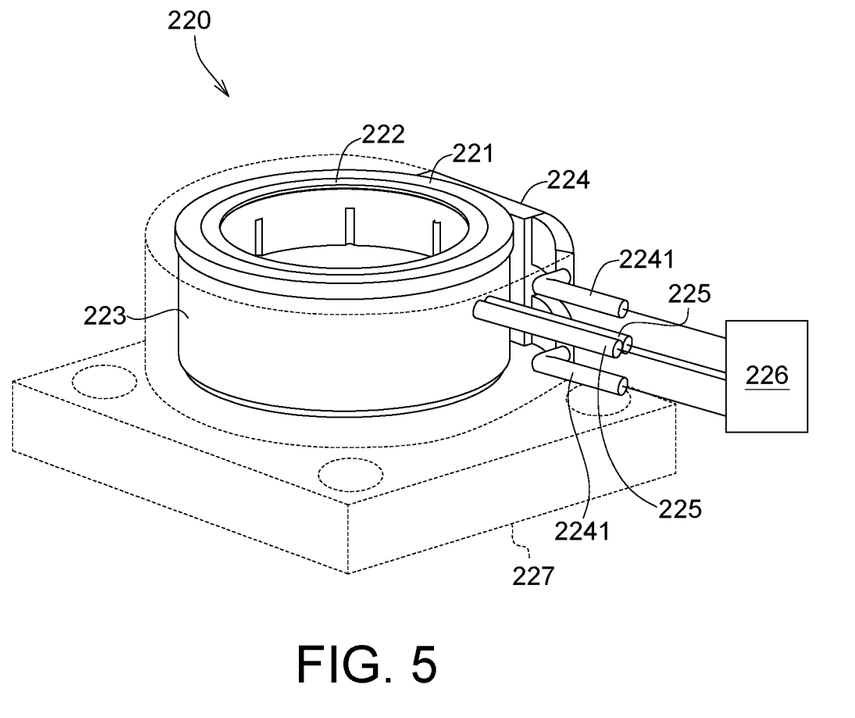
FIG. 5 is a schematic diagram of a heating device according to another embodiment of the present invention.

FIG. 5 is a schematic diagram of a heating device 220 according to another embodiment of the present invention. The heating device 220 includes a thermal sleeve 221, a thermally conductive elastomer 222, a heating sheet 223, a thermo switch 224, at least one conducting wire 225, a controller 226 and a casing 227 (represented by dotted lines). The structures of the thermal sleeve 221, the thermally conductive elastomer 222, the heating sheet 223, the conducting wire 225, the controller 226 and the casing 227 of the present embodiment are respectively identical or similar to the structures of the thermal sleeve 121, the thermally conductive elastomer 122, the heating sheet 123, the conducting wire 125, the controller 126 and the casing 127, and the similarities are not repeated here. The heating device 220 of the present embodiment is different from the heating device 120 of the above embodiment in that the heating device 220 further includes a thermo switch 224. Additionally, the heating device 220 can be installed on the camera device 110 to form another camera.

The thermo switch 224 can be realized as a current temperature protection element. The thermo switch 224 is configured on the heating sheet 223, and can be connected to the heating sheet 223 and the conducting wire 225 in series. The heating sheet 123 can be activated through the conducting wire 225, and the thermo switch 224 can provide a protection mechanism. For example, when the temperature of the heating sheet 223 is too high, the thermo switch 224 switches off the current to reduce the temperature of the heating sheet 223. The thermo switch 224 has a plurality of conducting wires 2241 connected to the conducting wire 225 in series for instance. Alternatively, the thermo switch 224 is connected to the heating sheet 223, and can be further electrically connected to the conducting wire 225 in series through the heating sheet 223 (not illustrated). Moreover, the conducting wire 225 and the conducting wire 2241 of FIG. 5 can be electrically connected to the controller 226. In another embodiment, the conducting wire 225 can be connected to the conducting wires 2241 but the controller 226.

Figure 6A:
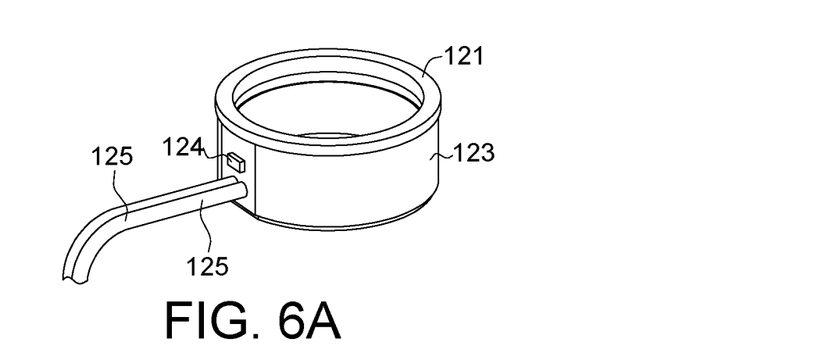
FIGS. 6A to 6C are process diagrams for manufacturing the camera of FIG. 1.
Figure 6B:
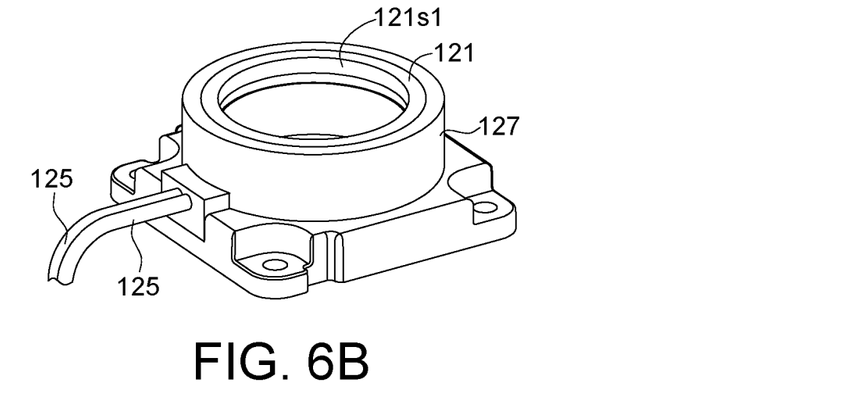
Figure 6C:
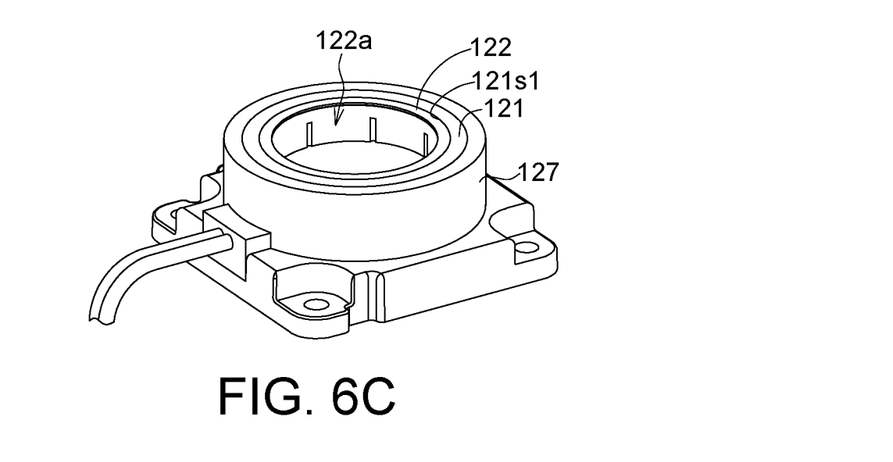

FIGS. 6A to 6C are process diagrams for manufacturing the camera 100 illustrated in FIG. 1. As indicated in FIG. 6A, a composite structure formed of the thermal sleeve 121, the heating sheet 123, the temperature sensor 124, the conducting wire 125 and the controller 126 (selective) is provided. If the controller 126 is not included in the step of FIG. 6A, the controller 126 can be coupled to the conducting wire 125 in subsequent steps. Then, as indicated in FIG. 6B, the casing 127 covering the composite structure of FIG. 6A can be formed using a mold by the injection molding technology. Then, as indicated in FIG. 6C, a thermally conductive elastomer material such as liquid silicone rubber can be formed on the first inner-wall surface 121s1 of the thermal sleeve 121 using another mold by the injection molding technology. The thermally conductive elastomer material can fill up the coarse structures on the first inner-wall surface 121s1 of the thermal sleeve 121, such that the thermally conductive elastomer material has completely contact with the first inner-wall surface 121s1 and the thermal resistance can be reduced. After the thermally conductive elastomer material cools down, the thermally conductive elastomer 122 will be cured as indicated in FIG. 4. Therefore, the heating device 120 is formed. The camera device 110 and the heating device 120 are assembled together. For example, the lens 111 of the camera device 110 can be squeezed into the accommodation portion 122a of the heating device 120. Due to the softness and elasticity of the thermally conductive elastomer 122, the lens 111 can be easily loaded into the accommodation portion 122a with little force. The camera 100 is formed with the relative position between the heating device 120 and the camera device 110 being fixed by the fixing element 130 (illustrated in FIG. 4).

The manufacturing process of the heating device 220 is similar to that of the heating device 120 except that the composite structure of FIG. 6A. The heating device 220 is formed of a thermal sleeve 221, a heating sheet 223, a thermo switch 224, at least one conducting wire 225, and a controller 226 (selectively). Other procedures of the manufacturing process of the heating device 220 are identical or similar to that of the heating device 120, and the similarities are not repeated here.

To summarize, the present invention provides a plug-in heating device disposed on a camera device. The heating device can heat the lens of the camera device to provide a defogging or defrosting effect to avoid water moisture being condensed as frost or ice on the surface of the camera device and negatively affect the image capturing quality of the camera device. In an embodiment, the heating device includes a thermal sleeve, a thermally conductive elastomer and a heating sheet, wherein the thermal sleeve is located between the thermally conductive elastomer and the heating sheet. The heat generated by the heating sheet can be transferred to the lens of the camera device through the thermal sleeve and the thermally conductive elastomer to defogging or defrosting.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A heating device installable on a camera device, wherein the heating device comprises:
    a thermal sleeve having a first inner-wall surface and a first outer-wall surface;
    a thermally conductive elastomer configured on the first inner-wall surface of the thermal sleeve and disposed between the camera device and the thermal sleeve, wherein the thermally conductive elastomer has an accommodation portion for receiving the camera device and tightly contacts with the camera device; and
    a heating sheet configured on the first outer-wall surface of the thermal sleeve and configured to conduct heat to the camera device through the thermal sleeve and the thermally conductive elastomer;
    wherein the thermal sleeve is disposed between the thermally conductive elastomer and the heating sheet and tightly contacts with the thermally conductive elastomer.

2. The heating device according to claim 1, further comprising:
    a casing, wherein the casing and the thermal sleeve together cover the entire heating sheet.

3. The heating device according to claim 1, further comprising:
    a temperature sensor configured on the heating sheet for sensing the temperature of the heating sheet; and
    a conducting wire connected to the heating sheet and electrically connected to the temperature sensor through the heating sheet.

4. The heating device according to claim 1, further comprising:
    a temperature sensor configured on the heating sheet for sensing the temperature of the heating sheet; and
    a controller electrically connected to the heating sheet for controlling the temperature of the heating sheet according to the signal of the temperature sensor.

5. The heating device according to claim 1, wherein the thermally conductive elastomer is formed of liquid silicone.

6. The heating device according to claim 1, wherein the thermally conductive elastomer has at least one groove and a second inner-wall surface, and the at least one groove is located on the second inner-wall surface.

7. The heating device according to claim 1, wherein the thermally conductive elastomer has a second outer-wall surface and a first engagement portion, the thermal sleeve has a second engagement portion matching the first engagement portion, the first engagement portion is formed on the second outer-wall surface and engaged with the second engagement portion.

8. The heating device according to claim 1, wherein the thermally conductive elastomer has a first flange and a second inner-wall surface, and the first flange is located on the leading edge of the thermally conductive elastomer and protruded from the second inner-wall surface.

9. The heating device according to claim 1, further comprising:
    a thermo switch configured on the heating sheet and electrically connected to the heating sheet.

10. The heating device according to claim 1, further comprising:
    a conducting wire connected to the heating sheet; and a controller located outside the heating sheet and connected to the conducting wire for controlling the temperature of the heating sheet through the conducting wire.

11. The heating device according to claim 1, wherein the thermal sleeve has a second flange extended outwards from the first outer-wall surface to stop the heating sheet.

12. The heating device according to claim 1, further comprising:
a casing covering the heating sheet and the thermal sleeve; and
a conducting wire passing through the casing from the heating sheet.

13. A camera, comprising:
a camera device; and
a heating device installed on the camera device according to claim 1.

14. The camera according to claim 13, wherein the heating device further comprises:
a casing, wherein the casing and the thermal sleeve together cover the entire heating sheet.

15. The camera according to claim 13, wherein the heating device further comprises:
a temperature sensor configured on the heating sheet for sensing the temperature of the heating sheet; and
a conducting wire connected to the heating sheet and electrically connected to the temperature sensor through the heating sheet.

16. The camera according to claim 13, wherein the heating device further comprises:
a temperature sensor configured on the heating sheet for sensing the temperature of the heating sheet; and
a controller electrically connected to the heating sheet for controlling the temperature of the heating sheet according to the signal of the temperature sensor.

17. The camera according to claim 13, wherein the thermally conductive elastomer has at least one groove and a second inner-wall surface, and the at least one groove is located on the second inner-wall surface.

18. The camera according to claim 13, wherein the thermally conductive elastomer has a second outer-wall surface and a first engagement portion, the thermal sleeve has a second engagement portion matching the first engagement portion, and the first engagement portion is formed on the second outer-wall surface and is engaged with the second engagement portion.

19. The camera according to claim 13, wherein the thermally conductive elastomer has a first flange and a second inner-wall surface, and the first flange is located on the leading edge of the thermally conductive elastomer and protruded from the second inner-wall surface.

20. The camera according to claim 13, wherein the thermal sleeve has a second flange extended outwards from the first outer-wall surface to stop the heating sheet.

* * * * *